United States Patent [19]

Muto et al.

[11] Patent Number: 4,691,862
[45] Date of Patent: Sep. 8, 1987

[54] HEATER UNIT FOR VEHICLES

[75] Inventors: Yoshihiko Muto; Toshio Ohashi, both of Atsugi; Tsunenari Adachi, Tochigi, all of Japan

[73] Assignees: Nissan Motor Co., Ltd.; Nihon Radiator Co., Ltd., both of Japan

[21] Appl. No.: 868,555

[22] Filed: May 30, 1986

[30] Foreign Application Priority Data

Jun. 6, 1985 [JP] Japan .................................. 60-121484

[51] Int. Cl.⁴ ............................................... B60H 1/02
[52] U.S. Cl. ................................. 237/12.3 A; 98/2.05; 98/2.08
[58] Field of Search ...................... 237/12.3 A, 12.3 B; 98/2.08, 2.05, 2.06, 2

[56] References Cited

U.S. PATENT DOCUMENTS 4,356,966 11/1982 Kado .............................. 237/12.3 A
4,582,252 4/1986 Ogihara et al. ................. 237/12.3 A

FOREIGN PATENT DOCUMENTS

1052458 12/1966 United Kingdom .
1157265 7/1969 United Kingdom .
2106637 4/1983 United Kingdom .

Primary Examiner—Henry A. Bennet
Attorney, Agent, or Firm—Leydig, Voit & Mayer

[57] ABSTRACT

A heater unit comprises a casing through which air flows in one direction from an inlet to outlets. A heater core is disposed within the casing for heating air passing therethrough. An air mix door is also disposed within the casing and has a pivotal end about which it is swingable for controlling the amount of air heated by the heater core and the amount of unheated air bypassing the same. In the above arrangement, air is difficult to pass through the heater core at a place adjacently behind the pivotal end of the air mix door whith respect to the direction of air flow. A tank portion of the heater core is disposed in the place adjacently behind the pivotal end of the air mix door with respect to the direction of air flow.

6 Claims, 13 Drawing Figures

HEATER UNIT FOR VEHICLES

BACKGROUND OF THE INVENTION

1. Field of the Invention

The present invention relates to heater units for vehicles particularly for motor vehicles.

2. Description of the Prior Art

An example of a prior art heater unit for a motor vehicle is shown in FIGS. 8 through 11. Referring to the figures, the heater unit generally indicated by the reference numeral 10 includes a casing 12 formed with an air inlet 14, a defroster outlet 16, a ventilator outlet 18 and a floor outlet 20. The heater unit 10 further includes a heater core 22 and an air mix door 24 disposed within the casing 12. The heater core 22 consists of a heater core main body portion 22a and a pair of tank portions 22b, 22c at the opposite ends of the heater core main body portion 22a. With the above structure, air is drawn through the inlet 14 into the casing 12. Some of the air is then transferred to the heater core 22 in accordance with the angle of orientation of the air mix door 24 which opens by swinging about a pivot shaft 24a, while the remaining air is transferred to the outlets 16, 18, 20 without passage through the heater core 22, so that the air temperature blowing out from the outlets 16, 18, 20 is controlled depending upon the amount of heated air passed through the heater core 22 and the amount of unheated air bypassing the same. Reference numeral 26 indicates an inlet pipe and 28 indicates an outlet pipe. Engine coolant is supplied through the inlet pipe 26 to the heater core 22 and is discharged therefrom through the outlet pipe 28.

In such a prior art heater unit 10 for a motor vehicle, air flow is interrupted by heater unit components as it passes through the heater core 22' such that minimal air flow occurs through the heater core main body portion 22a at a space $D_1$ located adjacently behind the pivotal end of the air mix door 24 with respect to the direction of air flow. Thus, space $D_1$ is termed a so-called dead space, or space of minimal air flow, because the heater core main body portion 22a cannot efficiently heat air here. Another dead space $D_2$ tends to form at a location $D_2$ in front of the heater core 22 with respect to the direction of air flow. For the above reason, efficient heat exchange and good use of space are not realized by the prior art heater unit 10.

Further, the heater core 22 is in many cases designed so that the tank portions 22b and 22c, at the upper and lower ends of the heater core main body 22a, project outward beyond the casing 12 resulting in that the lower tank portion 22c is likely to interfere with a duct to be attached to the floor outlet 20 while the upper tank portion 22b projects into a narrow space adjacent an instrument panel and is likely to interfere with adjacent parts.

Still further, it is necessary for the inlet and outlet pipes 26, 28 to be bent into complicated shapes and extended over a height "h" (shown in FIG. 11) for connection to the upper tank portion 22b projecting outward of the casing 12. It is desirable that the pipes 26, 28 be simpler in shape and more compact.

SUMMARY OF THE INVENTION

In accordance with the present invention, there is provided a novel and impoved heater unit for a vehicle. The heater unit includes a casing through which air flows in one direction, a heater core disposed within the casing for heating air passing therethrough, and an air mix door disposed within the casing which pivots about an end for controlling the amount of air passing through the heater core and the amount of air bypassing the same. The above structure may follow be constructed in conventional fashion.

In accordance with the present invention, a first tank portion attached to one lateral end of the heater core is disposed adjacently behind the pivotal end of the air mix door with respect to the direction of air flow in a space of minimal air flow and a second tank portion attached to the opposite end of the heater core is disposed in a corner of the casing providing another space of minimal air flow.

This structure is quite effective for overcoming the above noted shortcomings and disadvantages inherent in the prior art device.

It is accordingly an object of the present invention to provide a novel and improved heater unit for a vehicle which can realize efficient heat exchange as well as good use of space.

It is another object of the present invention to provide a novel and improved heater unit of the above described character which is simpler in shape and more compact as compared with the prior art device.

It is a further object of the present invention to provide a novel and improved heater unit of the above described character which can reduce manufacturing costs.

DETAILED DESCRIPTION OF THE PREFERRED EMBODIMENTS

Referring to FIGS. 1 through 4, in which parts corresponding to those of FIGS. 8 through 11 are designated by like reference numerals, a heater unit 30 according to an embodiment of the present invention will be described.

Figure 1:
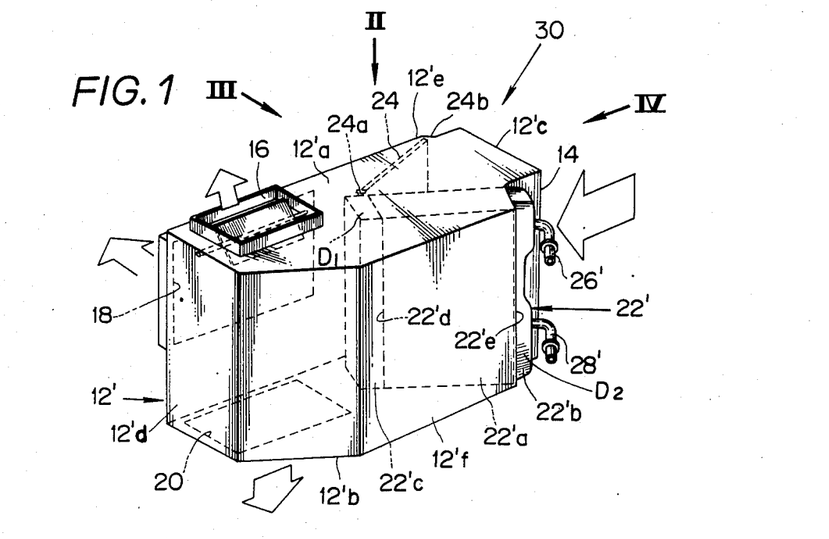
FIG. 1 is a schematic perspective view of a heater unit for a motor vehicle according to an embodiment of the present invention.
Figure 2:
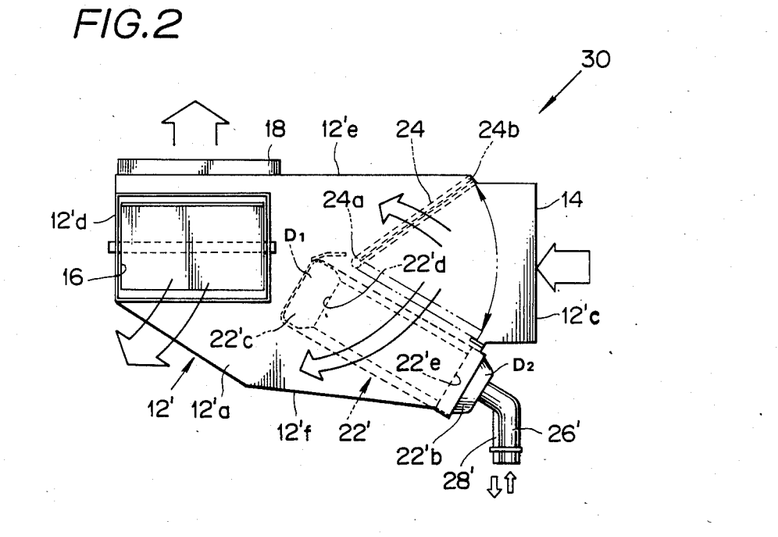
FIG. 2 is a plan view taken in the direction of the arrow II in FIG. 1.
Figure 3:
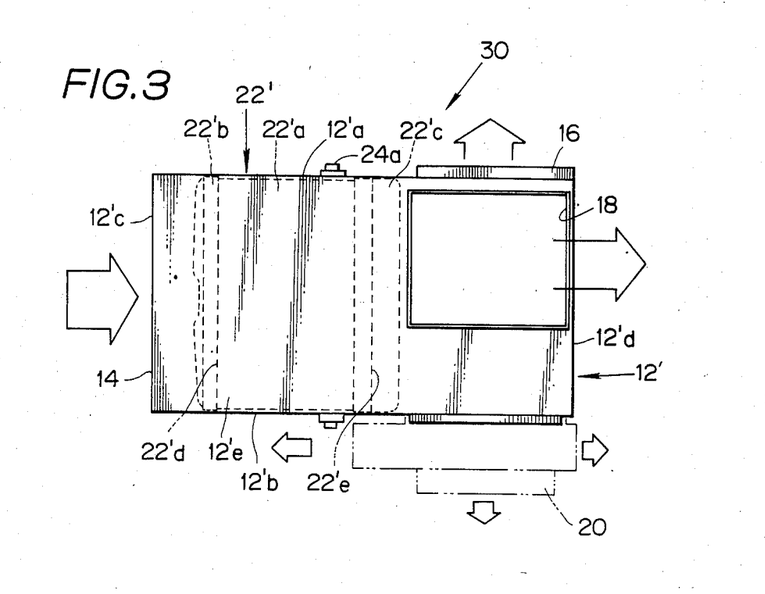
FIG. 3 is a side view taken in the direction of the arrow III in FIG. 1.
Figure 4:
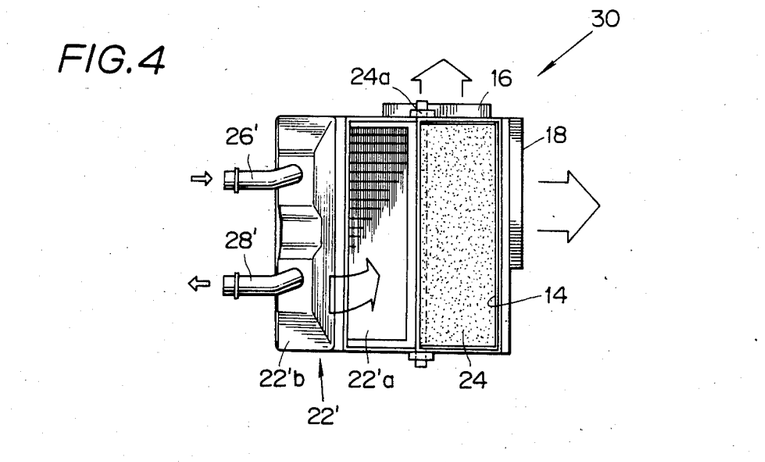
FIG. 4 is a side view taken in the direction of the arrow IV in FIG. 1.

As best seen from FIG. 2, the heater unit 30 of this invention includes a heater core 22' consisting of a heater core main body portion 22'a and a pair of tank portions 22'b, 22'c disposed on the opposed lateral sides or left and right sides of the heater core main body portion 22'a, differing from the conventional arrangement in which the tank portions 22b, 22c are disposed on the upper and lower sides of the heater core main body portion 22a.

More specifically, a casing 12' has a box-like shape including a pair of top and bottom end walls 12'a, 12'b, respectively, a pair of opposed first and second lateral end walls 12'c, 12'd, respectively, and a pair of opposed third and fourth lateral end walls 12'e, 12'f, respectively. The first lateral end wall 12'c is formed with an air inlet 14, while the top end wall 12'a, third lateral end wall 12'e and the bottom end wall 12'b are respectively formed with a defroster outlet 16, a ventilator outlet 18 and a floor outlet 20, all outlets positioned at locations adjacent the second lateral end wall 12'd. The heater core main body portion 22'a is rectangular and disposed vertically to extend between the top and bottom end walls 12'a, 12'b of the casing 12' in such a manner as to have a pair of opposed inner and outer lateral ends 22'd and 22'e respectively, the outer end being positioned adjacent the fourth lateral end wall 12'f and the inner end being positioned between the third and fourth lateral end walls 12'e, 12'f. An air mix door 24 has a pivotal end 24a adjacent the inner lateral end 22'd of the heater core portion 22'a and the other end 24b movable between the third lateral end wall 12'e and the outer end 22'e of the heater core main body portion 22'a. The tank portions 22'b, 22'c are respectively attached to the lateral ends 22'e, 22'd of the heater core main body portion 22'a, that is, the tank portion 22'b is disposed in a corner portion of the casing 12' between the first lateral end wall 12'c and the fourth lateral end wall 12'f. The above mentioned corner portion of the casing 12' is so shaped as to allow the tank portion 22'b to project outward therefrom. In the above arrangement, the tank portion 22'c is disposed in space $D_1$ adjacently behind the pivotal end 24a of the air mix door 24 with respect to the direction of air flow, while the tank portion 22'b is disposed in space $D_2$ in front of the heater core main body portion 22'a with respect to the direction of air flow. An inlet pipe 26' and outlet pipe 28' are attached to the tank portion 22'b disposed in the corner of the casing 12' adjacent the inlet 14, so that they can be simpler in shape and more compact as compared with those of the conventional arrangement.

With the above arrangement, since the tank portions 22'b, 22'c are disposed in spaces $D_2$, $D_1$ through which air passage is minimal, good use of space and improved heat exchange can be attained. Further, since the tank portions 22'c, 22'b are disposed on the left and right sides of the vertically disposed heater core main body portion 22'a, they do not project upwardly and downwardly extending beyond the casing 12'. Still further, since the inlet and outlet pipes 26', 28' are attached to the tank portion 22'b which is positioned on the side of the heater core portion 22'a nearest the inlet 14 and also since the tank portion 22'b is disposed in the corner portion of the casing 12', the inlet and outlet pipes 26', 28' can be shorter and straighter as compared with those of FIGS. 8 through 11, thus making it possible to reduce the manufacturing cost.

Figure 5:
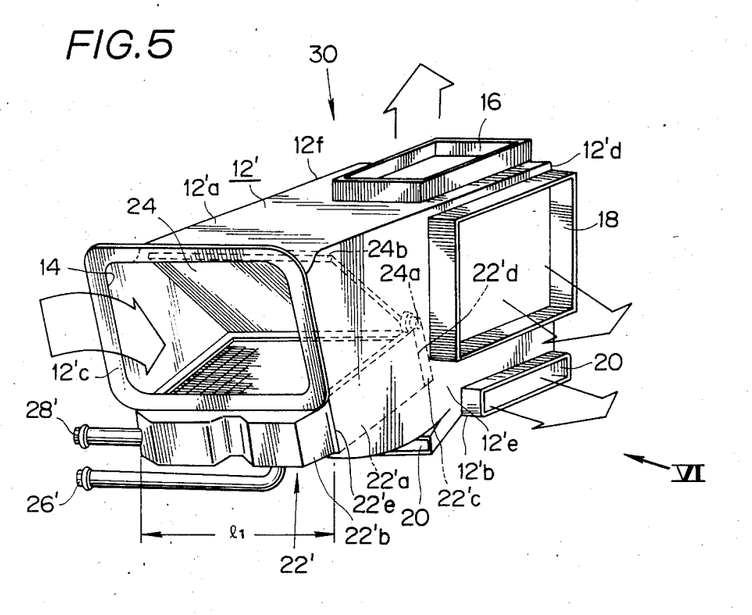
FIG. 5 is a schematic perspective view of a second embodiment of the present invention.
Figure 6:
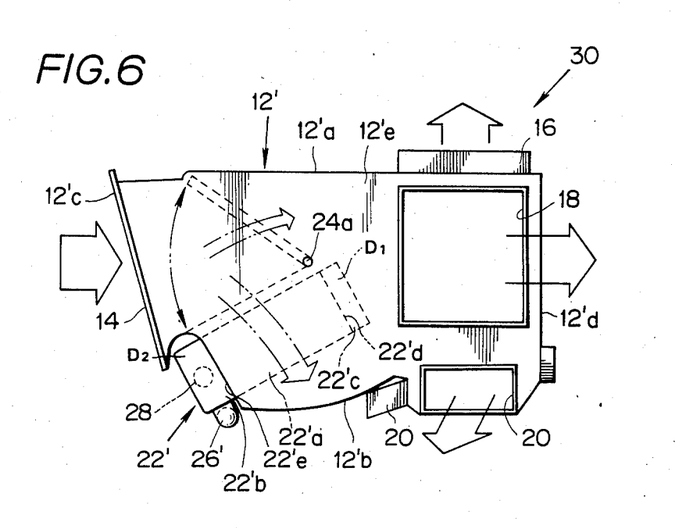
FIG. 6 is a side view taken in the direction of the arrow VI in FIG. 5.

FIGS. 5 and 6 show a second embodiment of the present invention. In this modified embodiment the heater core 22' is disposed nearly horizontally with outer lateral end 22'e adjacent the air inlet 14. The tank portion 22'b is mounted on heater core outer lateral end 22'e such that it is disposed in space $D_2$ outside of the casing 12' or in a second corner of the casing 12' between the bottom end wall 12'b and the first lateral end wall 12'c while the tank portion 22'c is mounted on heater core inner lateral end 22'd and is disposed in space $D_1$. More specifically, the outer lateral end 22'e of the nearly horizontally disposed heater core main body portion 22'a is positioned adjacent the bottom end wall 12'b of the casing 12' while the inner lateral end 22'd is positioned between the top and bottom end walls 12'a, 12'b. The air mix door 24 is so disposed as to have the pivotal end 24a adjacent the inner lateral end 22'd of the heater core main body portion 22'a such that the tank portion 22'c is disposed adjacently behind the pivotal end 24a with respect to the direction of air flow. The other end 24b is movable between the top end wall 12'a of the casing 12' and the outer lateral end 22'e of the heater core portion 22'a. With the above arrangement, the overall width of the heater unit 30 can be nearly the same as the width $\lambda_1$ of the heater core main body portion 22'a, thus making it possible to reduce the overall width of the heater unit 30'.

Figure 7:
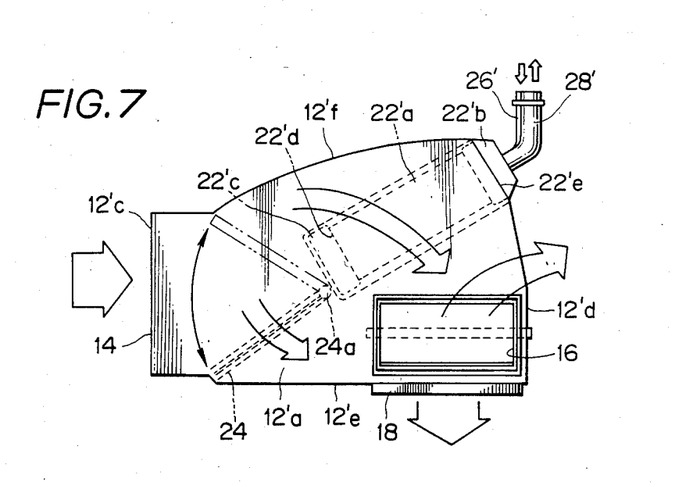
FIG. 7 is a schematic perspective view of a third embodiment of the present invention.
Figure 8:
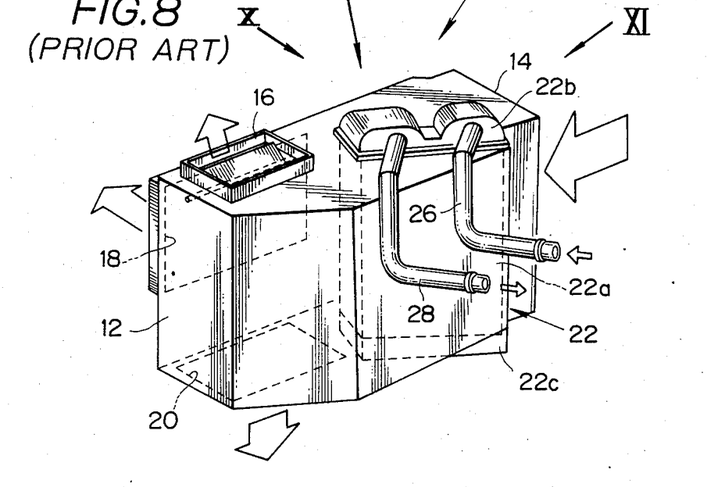
FIG. 8 is a view similar to FIG. 1 but showing a prior art heater unit.
Figure 9:
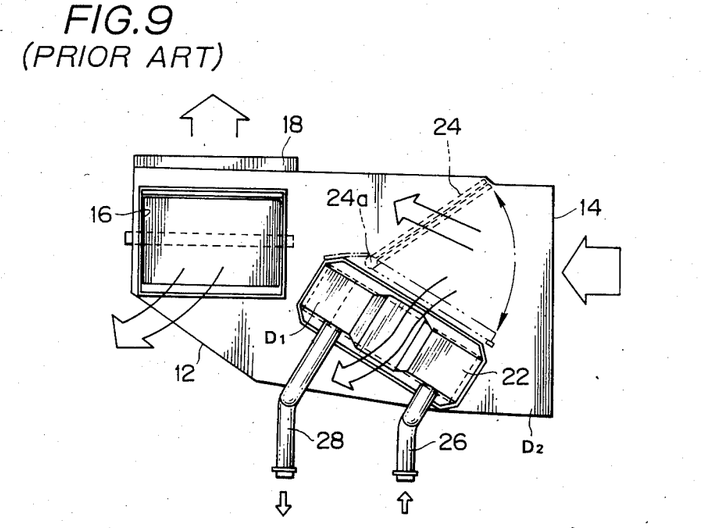
FIG. 9 is a view taken in the direction of the arrow IX in FIG. 8.
Figure 10:
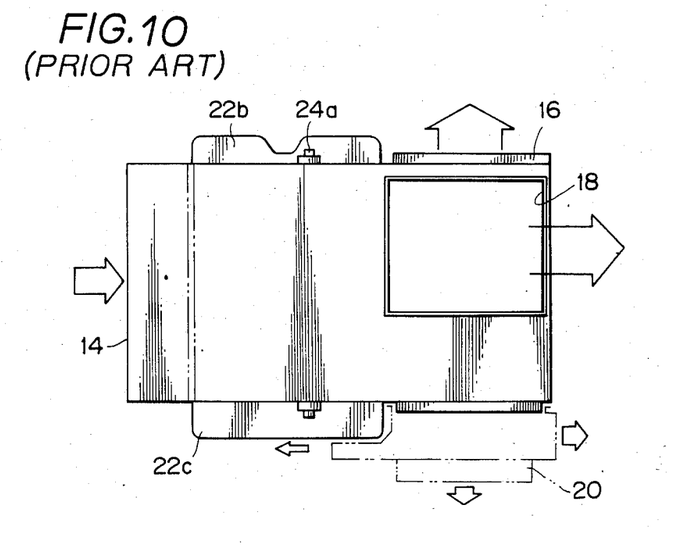
FIG. 10 is a side view taken in the direction of the arrow X in FIG. 8.
Figure 11:
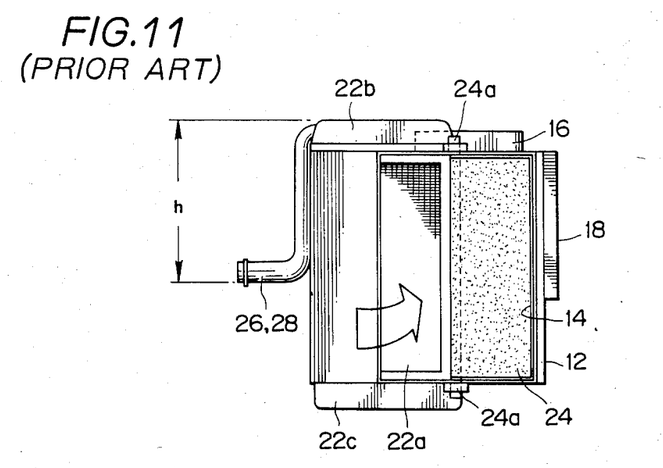
FIG. 11 is a side view taken in the direction of the arrow XI in FIG. 8.

FIG. 7 shows a third embodiment of the present invention. In this modified embodiment, in an open position and the air mix door 24 is arranged at an angle of approximately 180 degrees with the vertically disposed heater core 22' such that it extends nearly straightly from the heater core the arrangement being oriented diagonally relative to the walls comprising the casing and displaces the air outlet face of the heater core to a location which is effectively removed from cool air from the inlet bypassed by the door from the heater core. The arrangement also separates the inside of the casing 12' into two portions, i.e., an inlet side portion and an outlet side portion, when the air mix door 24 is open so as to allow all of the air the pass through the heater core 22'. When the air mix door 24 is in a closed position, i.e., oriented in a predetermined angle less than 180 degrees with the heater core 22', all of the air is supplied to the outlets 16, 18, 20 without passage through the heater core main body portion 22'a. More specifically, the tank portion 22'b of the heater core 22' is disposed in a third corner portion of the casing 12' between the second lateral end wall 12'd and the fourth lateral end wall 12'f, and the air mix door 24 has end 24b movable between the third and fourth lateral end walls 12'e, 12'f. In this embodiment, the tank portion 22'c is disposed in space $D_1$ behind the pivotal end 24a of the air mix door 24 with respect to the direction of air flow thus preventing space $D_1$ from becoming a dead space.

Figure 12:
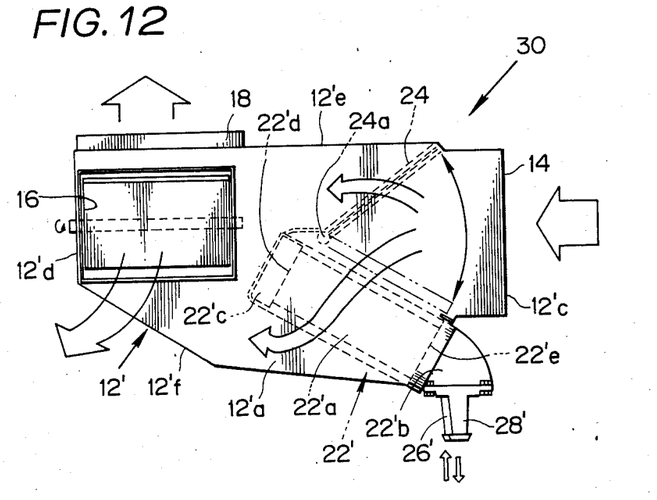
FIG. 12 is a plan view of a fourth embodiment of the present invention.
Figure 13:
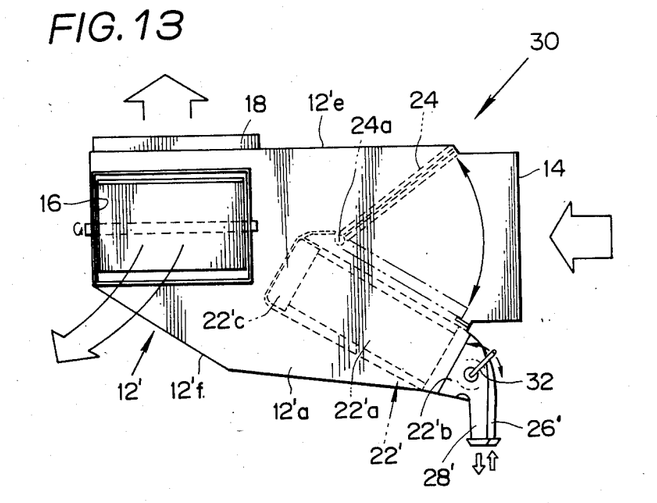
FIG. 13 is a plan view of a fifth embodiment of the present invention.

In the above embodiments the heater core 22' has been described and shown as being of an ordinary kind, though this is not limitative. For example, as shown in FIG. 12, the heater core 22' may be of another kind in which the inlet and outlet pipes 26', 28' are independent parts relative to the tank portion 22'b and detachably joined with same. Further, as shown in FIG. 13, the heater core 22' may be of a further different kind in which the tank portion 22'b is provided with a water valve 32 for controlling the supply of engine coolant to the heater core main body portion 22'a. The operation of water valve 32 is controlled in relation to the degree of the air mix door 24.

What is claimed is:

1. A heater unit for a vehicle, said heater unit comprising:

a casing having a box-like shape and including a pair of top and bottom end walls, a pair of opposed first and second lateral end walls, and a pair of opposed third and fourth lateral end walls, said first lateral end wall being formed with an air inlet while said top end wall, third lateral end wall, and said bottom end wall are each respectively formed with an air outlet, air entering said casing in one direction through said inlet and flowing through said casing to said outlets;

a heater core disposed within said casing for heating air passing therethrough, said heater core having a rectangular heater core main body portion which is disposed vertically to extend between said top and bottom end walls in such a manner as to have a pair of opposed inner and outer lateral ends the outer one of which is positioned adjacent said fourth lateral end wall and the inner one of which is positioned between said third and fourth lateral end walls, said heater core having a first tank portion attached to said inner lateral end of said heater core main body portion and a second tank portion attached to said outer lateral end of said heater core main body portion, said second tank portion being disposed in a corner portion of said casing between said first lateral end wall and said fourth lateral end wall, said casing being so formed as to allow said second tank portion to project outward therefrom; and an air mix door disposed within said casing and having a pivotal end about which it is swingable for controlling the amount of air passing through said heater core and the amount of air bypassing the same, said pivotal end of said air mix door being located adjacent said inner lateral end of said heater core main body portion such that said first tank portion is disposed adjacently behind said pivotal end of said air mix door with respect to the direction of air flow, said air mix door having another end which is opposite to said pivotal end and movable between said outer lateral end of said heater core main body portion and said third lateral end wall of said casing, said heater core further comprising a pair of inlet and outlet pipes attached to said second tank portion for supply and discharge of heating medium to and from said second tank portion.

2. A heater unit for a vehicle, said heater unit comprising:

a casing having a box-like shape and including a pair of top and bottom end walls, a pair of opposed first and second lateral end walls and a pair of opposed third and fourth lateral end walls, said first lateral end wall being formed with an air inlet while said top wall, third lateral end wall, and said bottom end wall are each respectfully formed with an air outlet, air entering said casing in one direction through said inlet and flowing through said casing to said outlets, said air outlet formed in said top end wall comprising a defroster outlet, said air outlet formed in said third lateral end wall comprising a ventilator outlet, and said air outlet formed in said bottom end wall comprising a floor outlet;

a heater core disposed within said casing for heating air passing therethrough, said heater core having a rectangular heater core main body portion which is disposed nearly horizontally to extend between said third and fourth lateral end walls in such a manner as to have a pair of opposed inner and outer lateral ends the outer one of which is positioned adjacent said bottom end wall and the inner one of which is positioned between said top and bottom end walls, said heater core having a tank portion attached to said inner lateral end of said heater core main body portion; and an air mix door mounted within said casing and having a pivotal end about which it is swingable for controlling the amount of air passing through said heater core and the amount of air bypassing the same, said pivotal end of said air mix door being located adjacent the inner lateral end of said heater core main body portion such that said tank portion is disposed adjacently behind said pivotal end of said air mix door with respect to the direction of air flow.

3. A heater unit for a vehicle, said heater unit comprising:

a casing having a box-like shape and including a pair of top and bottom end walls, a pair of opposed first and second lateral end walls and a pair of opposed third and fourth lateral end walls, the first lateral end wall being formed with an air inlet while the top wall, third lateral end wall, and said bottom end wall are each respectfully formed with an air outlet, air entering said casing in one direction through said inlet and flowing through said casing to said outlets, a heater core disposed within said casing for heating air passing therethrough, said heater core having a rectangular heater core main body portion which is disposed nearly horizontally to extend between said third and fourth lateral end walls in such a manner as to have a pair of opposed inner and outer lateral ends the outer one of which is positioned adjacent said bottom end wall and the inner one of which is positioned between said top and bottom end walls, said heater core having a first tank portion attached to said inner lateral end of said heater core main body portion;

said heater core also having a second tank portion attached to said outer lateral end of said heater core main body portion, said second tank portion being disposed in a corner portion of said casing between said first lateral end wall and said bottom end wall, said casing being so formed as to allow said second tank portion to project outward therefrom; and an air mix door disposed within said casing and having a pivotal end about which it is swingable for controlling the amount of air passing through said heater core and the amount of air bypassing the same, said pivotal end of said air mix door being located adjacent said inner lateral end of said heater core main body portion such that said first tank portion is disposed adjacently behind said pivotal end of said air mix door with respect to the direction of air flow;

said air mix door having another end which is opposite to said pivotal end and movable between said outer lateral end of said heater core main body portion and said top end wall of said casing;

said heater core further comprising a pair of inlet and outlet pipes attached to said second tank portion for supply and discharge of heating medium to and from said second tank portion.

4. A heater unit for a vehicle, said heater unit comprising:

a casing having a box-like shape and including a pair of top and bottom end walls, a pair of opposed first and second lateral end walls, and a pair of opposed third and fourth lateral end walls, said first lateral end wall being formed with an air inlet while said top end wall, third lateral end wall, and said bottom end wall are each respectively formed with an air outlet, air entering said casing in one direction through said inlet and flowing in a path through said casing to said outlets, the air flow being interrupted by heater unit components creating spaces within the casing experiencing minimal air flow;

a heater core disposed within said casing for heating air passage therethrough, said heater core having a rectangular heater core main body portion which is disposed within said casing in such a manner as to have a pair of opposed inner and outer lateral ends each located in one of the minimal air flow spaces within said casing, said heater core having a first tank portion attached to said inner lateral end of said heater core main body portion, said heater core having a second tank portion attached to the outer lateral end of the heater core main body portion, said second tank portion being disposed in a corner portion of said casing between two of said walls, the corner portion providing one of the minimal air flow spaces;

an air mix door disposed within said casing and having a pivotal end about which it is swingable for controlling the amount of air passing through said heater core and the amount of air bypassing the same and flowing between said inlet and said outlets, said pivotal end of said door providing a second one of the minimal air flow spaces adjacently behind said pivotal end of said air mix door with respect to the direction of air flow, said inner lateral end of said heater core main body portion and first tank portion attached thereto being disposed in the second one of the minimal air flow spaces within said casing, whereby greater efficiency in the use of space inside said casing is realized due to the location of both said first and second tank portions in minimal air flow spaces.

5. A heater unit as set forth in claim 4, in which said second tank portion attached to said outer lateral end of said heater core main body portion is disposed in a corner portion of said casing between said second lateral end wall and said fourth lateral end wall, said casing being so formed as to allow said second tank portion to project outward therefrom, said air mix door having an end which is opposite to said pivotal end and movable between said third and fourth lateral end walls, said heater core and said air mix door, when in an open position, being so arranged as to extend nearly straightly relative to each other and diagonally relative to the walls comprising said casing, which arrangement displaces the outlet face of said heater core to a location effectively removed from air bypassed by said door from said heater core and which arrangement separates the inside of said casing into an inlet side portion and an outlet side portion when said air mix door is in such a position as to allow the air to pass through said heater core, said heater core further comprising a pair of inlet and outlet pipes attached to said second tank portion for supply and discharge of heating medium to and from said second tank portion.

6. A heater unit as set forth in claim 1 in which said air outlet formed in said top end wall comprises a defroster outlet, said air outlet formed in said third lateral end wall comprises a ventilator outlet, and said air outlet formed in said bottom end wall comprises a floor outlet.

* * * * *